UNITED STATES PATENT OFFICE 2,413,957

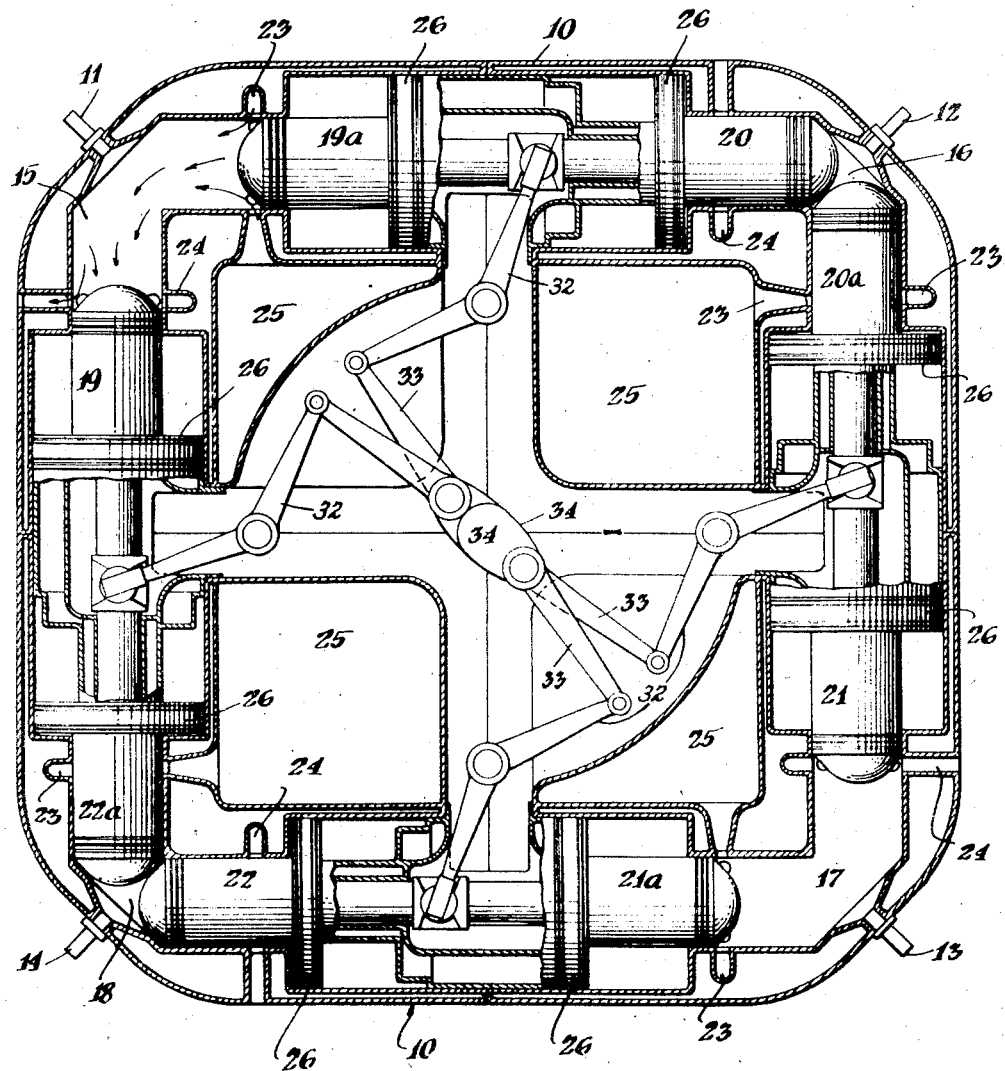

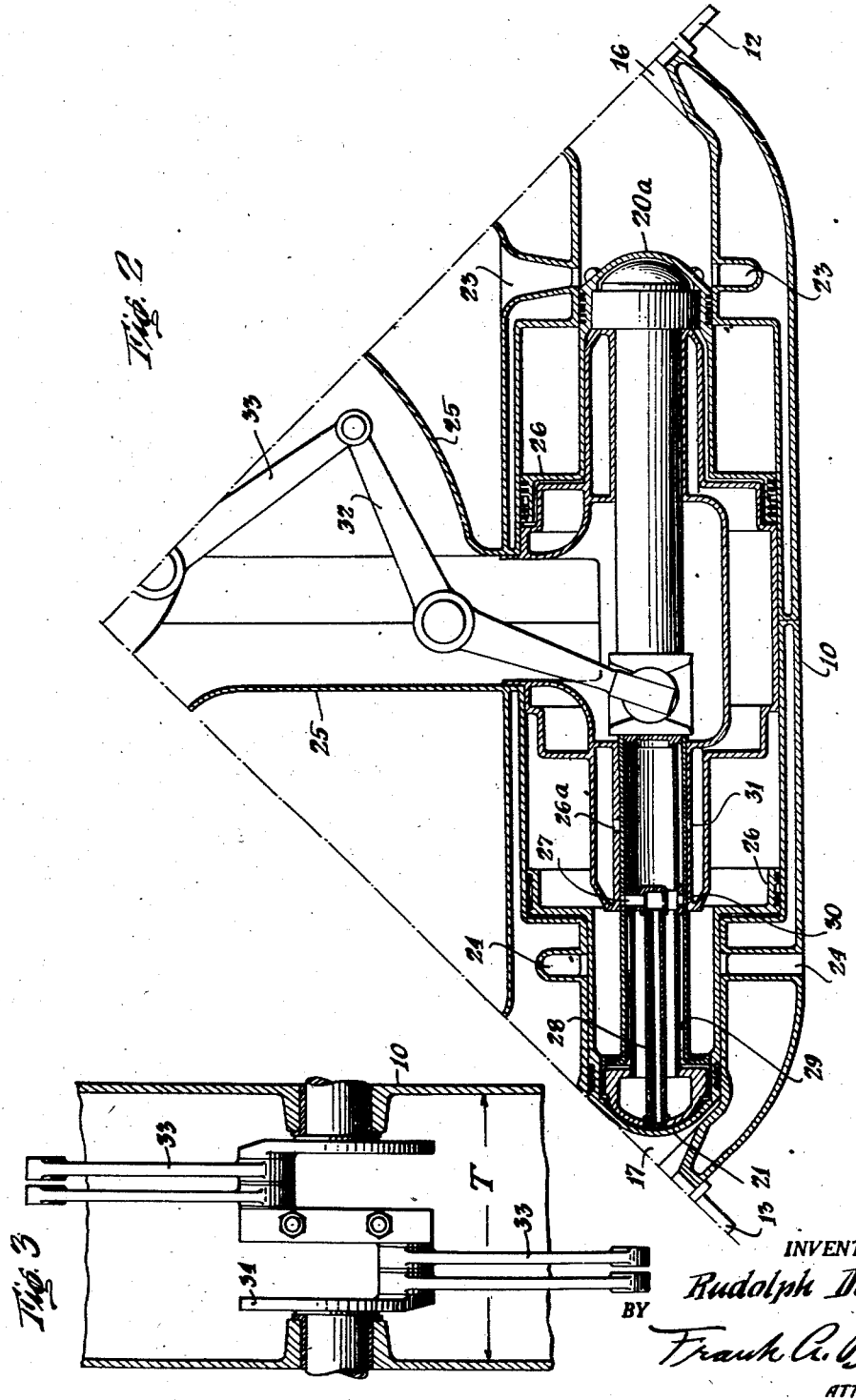

INTERNAL-COMBUSTION ENGINE

Rudolph Daub, West Caldwell, N. J.

Application January 30, 1945, Serial No. 575,233

7 Claims. (Cl. 123—53)

This invention relates to internal combustion engines similar to those of the socalled free piston type acting as a gas generator. The power developed is mainly or entirely absorbed in air compressors employed to scavenge and charge the engine cylinders. The pistons of these compressors are carried directly by the power pistons and are double acting. The balance of the useful energy created in engine cylinders is expelled through the exhaust ports in the form of gases, these gases being used as the propelling agent in a gas turbine or the like. The pistons, acting as valves in timed relation to each other, and in relation to the combustion cycle are linked or synchronized either pneumatically, hydraulically or mechanically.

The main object of this invention is to provide a free piston device of great compactness and light weight for the power developed.

A further object is to provide a free piston device possessing inherent dynamic balance.

A further object is the embodiment of the engine elements in a basic form of sectional unit or "slice" of relatively flat shape and adapted to be combined with similar units in desired number to develop a wide range of horsepowers.

Other objects would appear from the following specification taken with the accompanying drawings in which Fig. 1 is a cross section of a free piston engine with the synchronized mechanism shown of the mechanical type and illustrating one embodiment of the invention;

Fig. 2 is a sectional view of the lower quadrant of Fig. 1 drawn to enlarged scale, and Fig. 3 is a fragmentary section taken in the plane of the axis of the crank shaft.

Referring to the drawings the housing of the sectional unit is of approximately square shape designated generally at 10 and having a thickness T (Fig. 3). At the corners of the square are provided fuel injectors 11, 12, 13 and 14 injecting their fuel into the corner combustion chambers 15, 16, 17 and 18. In open communication with these combustion chambers are the cylinder bores of the engine pistons 19, 19a, 20, 20a, 21, 21a and 22, 22a, each pair of engine pistons forming the inner confines of their respective combustion chambers at the moment of reaching their inner dead centers. At their outer dead centers one of the pistons of each pair controls its intake port 23, the other the exhaust port 24. The intake ports are in communication with surge chambers 25 charged by double acting compressor pistons 26 in conventional manner by valves not shown, the compressor pistons being directly carried by the engine pistons. The path taken by the scavenging air and exhaust gases is shown at the upper left hand corner of Fig. 1, corresponding to the operation of a two cycle engine with uniflow scavenging.

Firing takes place at the same instant in the combustion chambers located at diagonally opposite corners of the slice or unit as in chambers 15 and 17, and then in chambers 16 and 18 and so on alternately. Thereby both the explosion and inertia forces produced balance each other and render the mechanism completely balanced since no torque reaction is transmitted to the housing 10, and the combined center of gravity of all pistons is not displaced but remains always at the center of the housing 10 irrespective of the position of the pistons.

The engine is preferably water-cooled in the spaces around the cylinders and pistons as shown, the cooling liquid being supplied into the gas and passages in any desired manner, preferably from a lower opening or openings in the casing and passing out through an upper opening or openings. The pistons themselves are preferably water-cooled, for instance as shown in Fig. 2, the water entering through hole 26, hole 27 and pipe 28. After passing by the inner side of the piston head and piston ring lands, it is discharged through the annulus 29 and hole 30 and hole 31.

In the engine shown in the drawings, the synchronization of the piston takes place by means of walking beams 32, connecting rods 33 and crank shaft 34.

Only a part of the power developed is delivered by the crank shaft for the water pump fuel injectors and other accessories.

The engine structure is symmetrical and compact and relatively light in proportion to the power developed.

The dynamic balance resulting from the symmetry of the structure reduces vibration to a minimum, each pair of explosions being directly opposed by the compressions at the opposite ends of all four of the moving piston units, this compression resistance being in direct line with the explosion impulse. This gives a very smooth and efficient explosion and compression action throughout the entire cycle of operation and aids in reducing the size and weight of the engine structure and very little force is required to be transmitted to the synchronizing linkages and crank shaft, the torque imposed being just enough to drive the water pump fuel injectors and other accessories.

A very large part of the energy of the explosions in the combustion chambers is delivered at high temperature and pressure to the discharge from these chambers, thus providing a very compact and efficient source of high pressure, high temperature gas for gas turbines and the like. The exhaust ports are uncovered in advance of the intake or supply ports so that the combustion chamber pressures are concentrated on the propelling of the discharge through the outlet ports, the high pressure intake gases then acting to scavenge the combustion chambers and augment the volume of gases supplied to the discharge. The result is a very smooth conversion of the heat energy of the mixed gases into the supply of gas under high pressure and at high temperatures.

I claim:

1. A gas generator comprising a plurality of pairs of cylinders in polygonal formation around a center, pairs of power developing pistons in said cylinders with a combustion chamber between the pistons of each pair, compressor pistons carried by said power pistons and acting to compress gas for supply to said combustion chambers, means for synchronizing said pistons to move a plurality of pairs of power pistons into their combustion chambers at symmetrically opposite points of said polygonal formation, means exploding the compressed gases at said points and delivering the main output of power from said explosions to the discharge of gases at high temperature from the combustion chambers of said generator.

2. A gas generator as set forth in claim 1 in which the combustion chambers are located at the corners of the polygonal formation.

3. A gas generator as set forth in claim 1 in which the pistons are mechanically synchronized by mechanism connecting them to a crank shaft at the center of the polylgon.

4. A gas generator as set forth in claim 1 in which the mechanism is contained within a generally polygonal casing having a relatively small thickness forming a flat sectional unit.

5. A gas generator as set forth in claim 1 in which the mechanism is contained within a generally polygonal casing having a relatively small thickness forming a flat sectional unit having at its center a crank shaft driven from said power pistons.

6. A gas generator as set forth in claim 1 in which the mechanism is contained within a generally polygonal casing having a relatively small thickness forming a flat sectional unit having at its center a crank shaft driven from said power pistons and adapted to be assembled with adjacent similar units to multiply the power as desired.

7. A gas generator comprising a plurality of pairs of cylinders, pairs of power-developing pistons in said cylinders with a combustion chamber between the pistons of each pair, intake and exhaust ports in said cylinders controlled by the movements of said pistons for two-cycle operation, compressor pistons carried by said power pistons and acting to compress gas for supply to said combustion chambers, means for synchronizing said pistons to move a plurality of pairs of power pistons into their combustion chambers at symmetrically opposite points of the generator, means exploding the compressed gases at said points and delivering the main output of power from said explosions to the discharge of gases at high temperature from the combustion chambers of the generator.

RUDOLPH DAUB.